United States Patent
VanderLeest et al.

(10) Patent No.: US 9,836,418 B2
(45) Date of Patent: Dec. 5, 2017

(54) SYSTEM AND METHOD FOR DETERMINISTIC TIME PARTITIONING OF ASYNCHRONOUS TASKS IN A COMPUTING ENVIRONMENT

(71) Applicant: DornerWorks, Ltd., Grand Rapids, MI (US)

(72) Inventors: Steven H. VanderLeest, Grand Rapids, MI (US); Nathan C. Studer, Grand Rapids, MI (US)

(73) Assignee: DornerWorks, Ltd., Grand Rapids, MI (US)

( * ) Notice: Subject to any disclaimer, the term of this patent is extended or adjusted under 35 U.S.C. 154(b) by 581 days.

(21) Appl. No.: 14/190,272

(22) Filed: Feb. 26, 2014

(65) Prior Publication Data

US 2014/0281088 A1     Sep. 18, 2014

Related U.S. Application Data

(60) Provisional application No. 61/778,474, filed on Mar. 13, 2013.

(51) Int. Cl.
*G06F 3/00* (2006.01)
*G06F 13/26* (2006.01)
*G06F 9/48* (2006.01)

(52) U.S. Cl.
CPC ............ *G06F 13/26* (2013.01); *G06F 9/4887* (2013.01); *G06F 2209/485* (2013.01)

(58) Field of Classification Search
CPC ..... G06F 3/00; G06F 5/00; G06F 9/00; G06F 12/00; G06F 13/00
See application file for complete search history.

(56) References Cited

U.S. PATENT DOCUMENTS

| | | | |
|---|---|---|---|
| 6,754,690 B2 | 6/2004 | Larson |
| 7,207,042 B2 | 4/2007 | Smith et al. |
| 7,302,685 B2 | 11/2007 | Binns et al. |
| 7,486,693 B2 | 2/2009 | Walter et al. |
| 7,533,207 B2 | 5/2009 | Traut et al. |
| 7,788,673 B2 | 8/2010 | Bibby |
| 7,849,463 B2 | 12/2010 | Ginsberg |
| 7,962,679 B2 | 6/2011 | van de Ven |
| 7,987,385 B2 | 7/2011 | Pruiett et al. |
| 8,316,368 B2 | 11/2012 | Vestal et al. |
| 8,321,614 B2 | 11/2012 | Wolfe |
| 8,588,970 B2 | 11/2013 | Fletcher et al. |

(Continued)

FOREIGN PATENT DOCUMENTS

WO     0041358     7/2000

*Primary Examiner* — Scott Sun

(74) *Attorney, Agent, or Firm* — Warner Norcross & Judd LLP

(57) ABSTRACT

A method of scheduling and controlling asynchronous tasks to provide deterministic behavior in time-partitioned operating systems, such as an ARINC 653 partitioned operating environment. The asynchronous tasks are allocated CPU time in a deterministic but dynamically decreasing manner. In one embodiment, the asynchronous tasks may occur in any order within a major time frame (that is, their sequencing is not statically deterministic); however, the dynamic time allotment prevents any task from overrunning its allotment and prevents any task from interfering with other tasks (whether synchronous or asynchronous).

33 Claims, 7 Drawing Sheets

(56) References Cited

U.S. PATENT DOCUMENTS

| | | |
|---|---|---|
| 2002/0144010 A1 | 10/2002 | Younis et al. |
| 2006/0107264 A1 | 5/2006 | Schmidt et al. |
| 2009/0158288 A1* | 6/2009 | Fulton ................ G06F 9/4881 718/103 |
| 2011/0093638 A1* | 4/2011 | Divirgilio ............ G06F 9/3851 710/267 |
| 2011/0296379 A1 | 12/2011 | McCready |
| 2012/0303850 A1 | 11/2012 | Sarkar |
| 2013/0036421 A1 | 2/2013 | Miller et al. |

\* cited by examiner

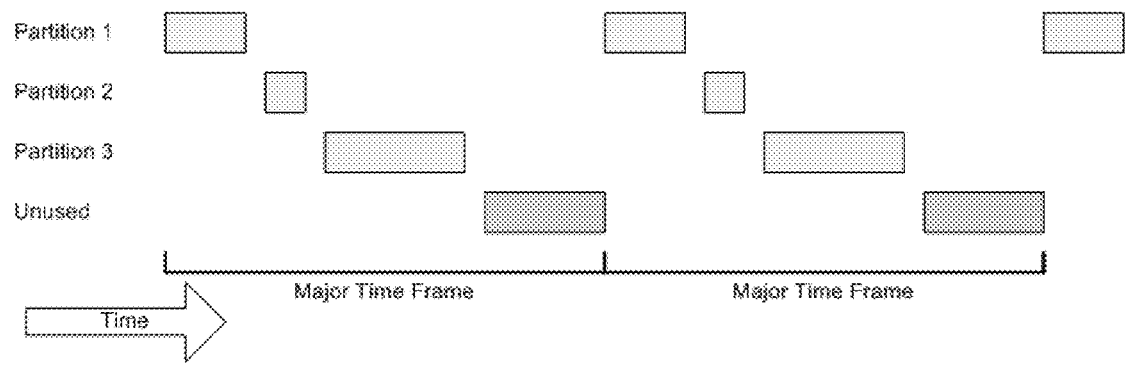
Figure 1: Statically Allocated Partitions in Major Time Frame
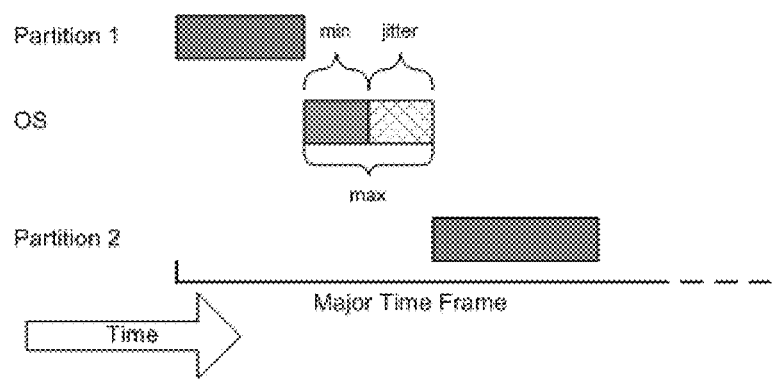
Figure 2: Partition Scheduling Jitter
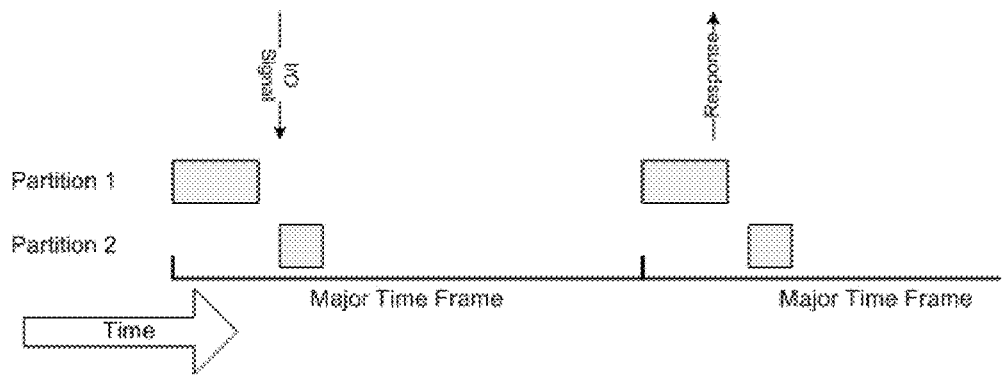
Figure 3: I/O Handling via Polling

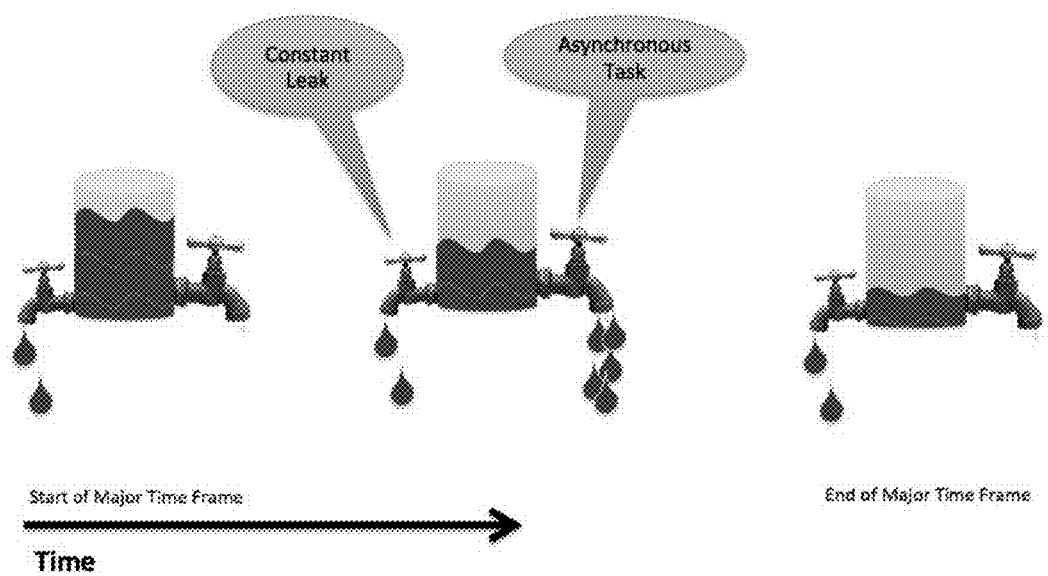
Figure 4: Leaky Water Cooler Algorithm
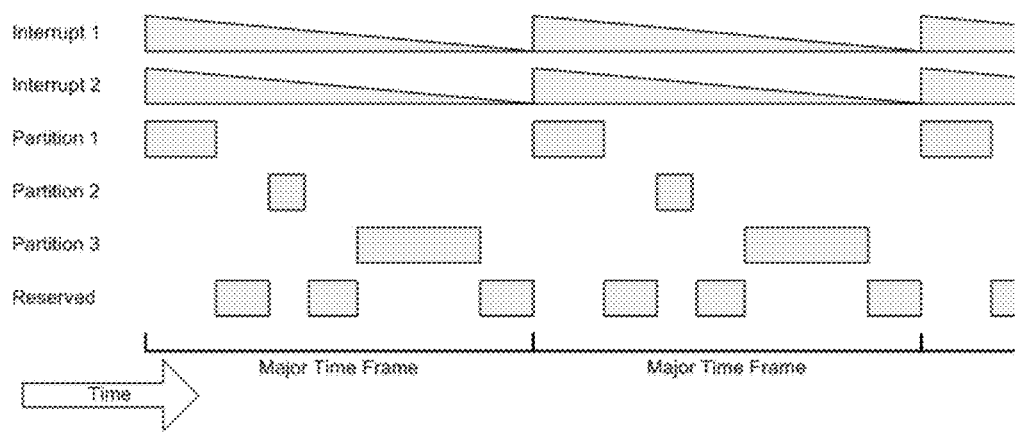
Figure 5: Dynamic and Static Time Allocated in Major Time Frame

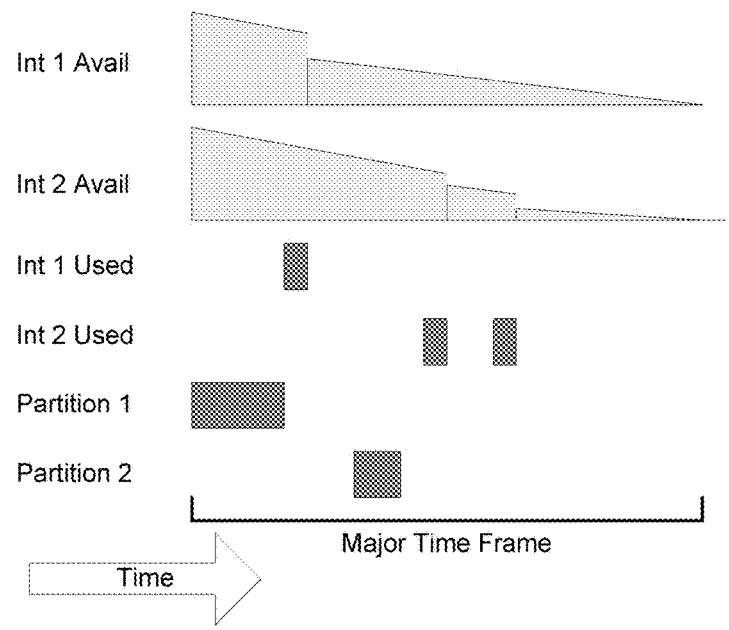
Figure 6: Time Utilized in Major Time Frame
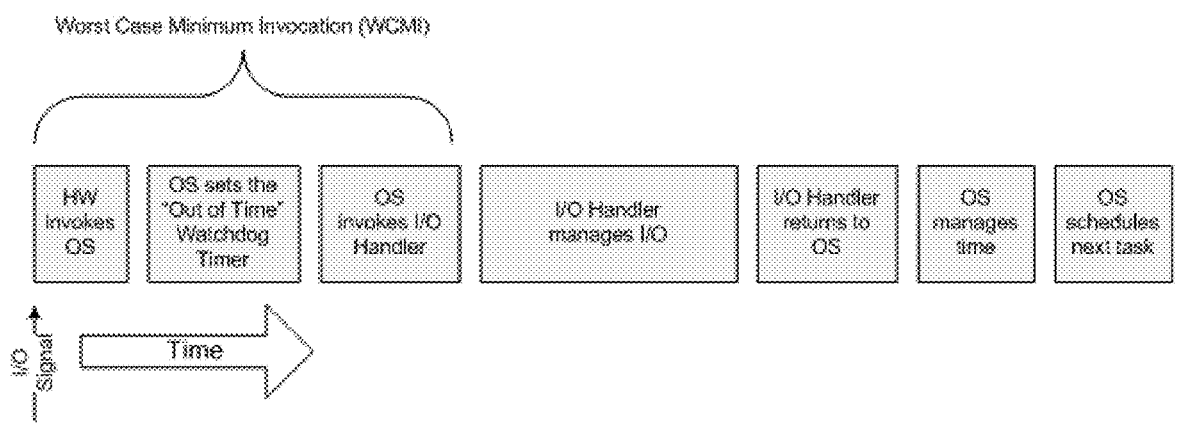
Figure 7: Components of Asynchronous Task Time

|  | Relative Time within Major Time Frame | | | | | | | | | | | | | | |
| --- | --- | --- | --- | --- | --- | --- | --- | --- | --- | --- | --- | --- | --- | --- | --- |
| Task | 00 | 05 | 10 | 15 | 20 | 25 | 30 | 35 | 40 | 45 | 50 | 55 | 00 | 05 | 10 |
| P1 | ▓ | ▓ | | | | | | | | | | | ▓ | ▓ | |
| P2 | | | | | ▓ | ▓ | | | | | | | | | |
| P3 | | | | | | | | | ▓ | ▓ | | | | | |
| Int1 | | | ▓ | | | | | | | | | | | | |
| Int2 | | | | ▓ | | | | | | | | | | | |
| Int3 | | | | | | | ▓ | | | | | | | | |
|  | First Function | | | | | | | | | | | | | | |
| Int 1 Avail | 10.0 | 10.0 | 10.0 | 7.5 | 7.5 | 7.5 | 7.5 | 7.5 | 5.0 | 5.0 | 5.0 | 2.5 | 10.0 | 10.0 | 10.0 |
| Int 2 Avail | 6.0 | 6.0 | 6.0 | 3.5 | 3.5 | 3.5 | 3.5 | 3.5 | 2.3 | 2.3 | 2.3 | 1.2 | 6.0 | 6.0 | 6.0 |
| Int 3 Avail | 9.0 | 9.0 | 9.0 | 9.0 | 9.0 | 9.0 | 9.0 | 4.0 | 2.7 | 2.7 | 2.7 | 1.3 | 9.0 | 9.0 | 9.0 |
|  | Alternate Function | | | | | | | | | | | | | | |
| Int 1 Avail | 10.0 | 10.0 | 10.0 | 6.5 | 4.5 | 4.5 | 4.5 | 2.5 | 0.5 | 0.5 | 0.5 | 0.0 | 10.0 | 10.0 | 10.0 |
| Int 2 Avail | 6.0 | 6.0 | 6.0 | 2.9 | 1.8 | 1.8 | 1.8 | 0.7 | 0.0 | 0.0 | 0.0 | 0.0 | 6.0 | 6.0 | 6.0 |
| Int 3 Avail | 9.0 | 9.0 | 9.0 | 7.3 | 6.5 | 6.5 | 6.5 | 0.6 | 0.0 | 0.0 | 0.0 | 0.0 | 9.0 | 9.0 | 9.0 |
Figure 8: Example Computation of Dynamic Time Remaining
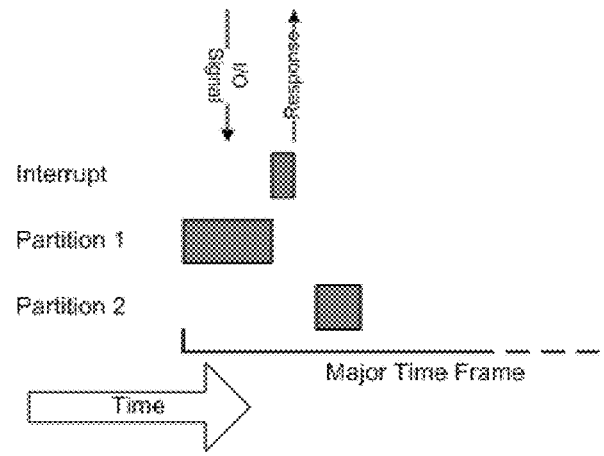
Figure 9: I/O Signal Response with Interrupts

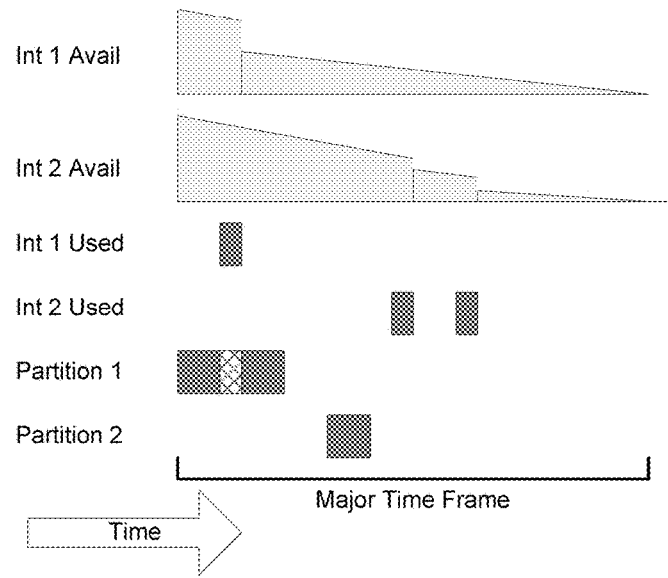
Figure 10: Interrupts Allowed during Partitions
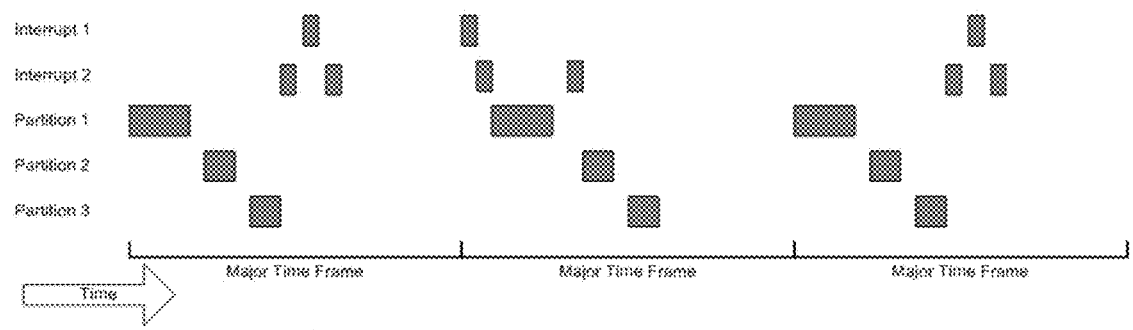
Figure 11: Synchronous Partitions with Large Jitter due to Asynchronous Tasks

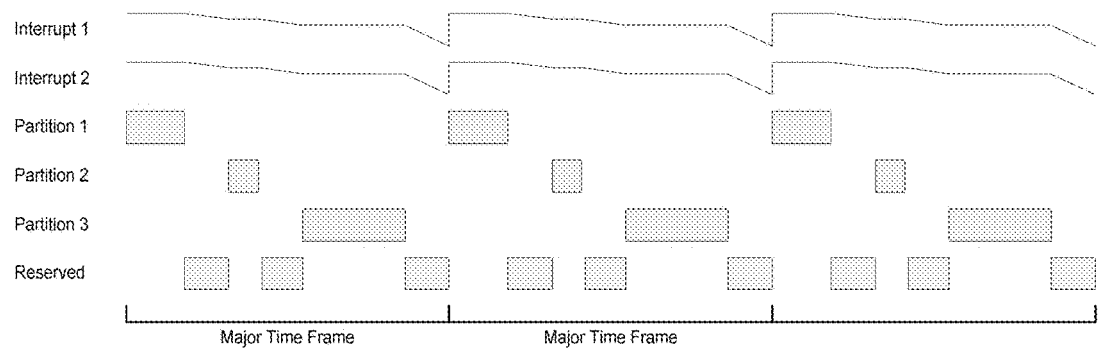
Figure 12: Dynamic and Static Time Allocated in Major Time Frame
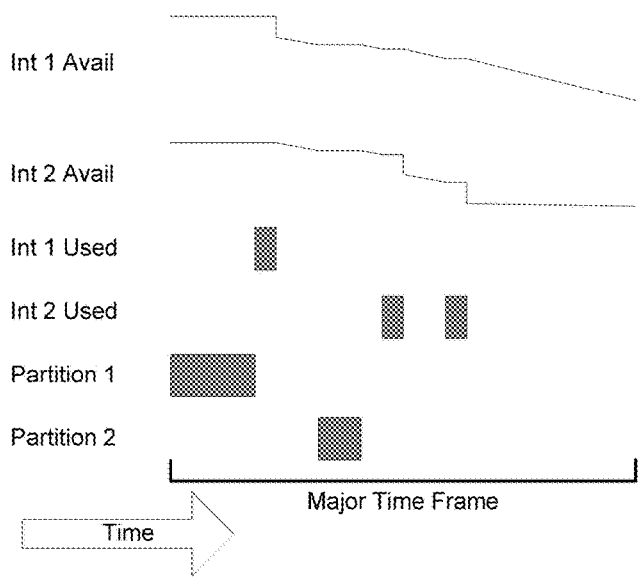
Figure 13: Time Utilized in Major Time Frame

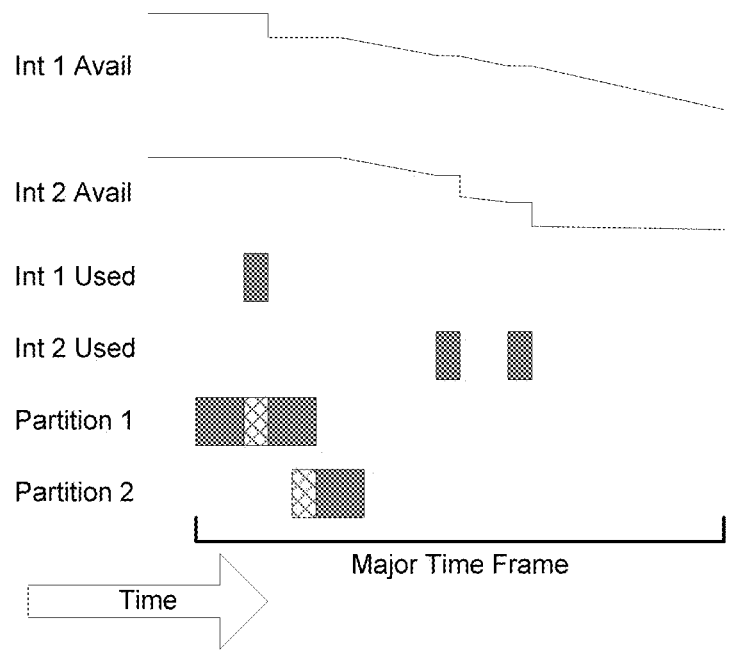
Figure 14: Interrupts Allowed during Partitions
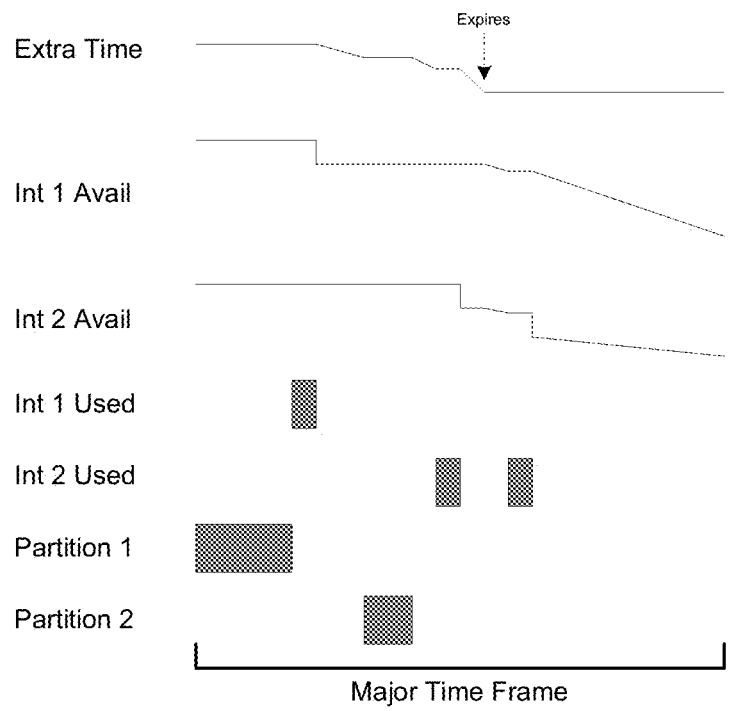
Figure 15: Delay While Extra Time Remains

SYSTEM AND METHOD FOR DETERMINISTIC TIME PARTITIONING OF ASYNCHRONOUS TASKS IN A COMPUTING ENVIRONMENT

BACKGROUND OF THE INVENTION

The present invention relates to systems and methods for managing computing resources, and more particularly to systems and methods for scheduling and controlling asynchronous tasks to provide deterministic behavior in time-partitioned operating systems.

An Operating System ("OS") is software that manages computing hardware on behalf of user applications. The OS manages hardware resources such as the computer memory, the Input/Output (I/O) devices including the hard drive and the network interface, and so forth. One of the most important hardware resources managed by the OS is the central processing unit ("CPU"). The OS allocates time on CPU to each application, one at a time, by means of a scheduling algorithm that selects which application (called a process when executing) will be run on the CPU next. The OS itself must run on the CPU in order to execute the scheduling algorithm, so whenever a process calls the operating system (e.g., through an I/O system call), the OS is invoked and run on the CPU. It then selects the next process to run. The OS also sets a hardware timer to expire on a periodic basis. When the timer expires, the hardware invokes the OS, interrupting the running process so that the OS can select a new process to run, based on the scheduling algorithm. A computer chip that contains more than one CPU is called a multicore processor. Each core is a CPU. The OS then schedules a different process for each core. A number of scheduling algorithms are available for an OS to use. Some algorithms provide good responsiveness to user input in a Graphical User Interface (GUI), e.g., by providing more CPU time to the application running in the window on the top of the GUI desktop. Some algorithms provide CPU time in order to improve the likelihood that each process meets any declared deadlines. A Real Time Operating System (RTOS) uses scheduling algorithms that provide strong guarantees for meeting deadlines.

A partitioned operating environment is a special type of OS that strictly manages all shared hardware resources (such as the CPU, memory, and I/O) so that each application is guaranteed to receive its allocated share of the managed resources during any specified time interval, where this interval is sometimes called the "major time interval". Each application receives a portion of the time on a time-partitioned resource, such as the CPU, called a partition window. During that window of time, the application has sole access to the resource and to the exclusion of all other applications.

In many time-partitioned operating systems (including, but not limited to ARINC 653 partitioned operating environments), a repeating major time frame is used to periodically run all applications in the system. Each application is statically scheduled during one or more of the partition windows during the major time frame. FIG. 1 illustrates three partitions allocated in a major time frame. FIG. 1 shows the time allocated to each partition for two consecutive major time frames. It also includes a portion of unused time in each major time frame. As can be seen, each partition receives a deterministic amount of CPU time during each major time frame. The operating system enforces this allocation so that no partition uses more than its allotment and no partition can interfere with other partitions. The partitions may themselves contain not only applications, but an entire operating system. The basic principle of time partitioning remains the same.

The gap in time between the partitions shown in FIG. 1 represents the overhead time required by the operating system to stop one partition and start another. This is sometimes called the partition switch time. The partition switch time varies between the minimum time (Best-Case Execution Time) and the maximum time (Worst-Case Execution Time) of the operating system task responsible for switching partitions off and on the CPU. This variation is called the jitter, illustrated in FIG. 2. Some time-partitioned operating systems, including many implementations of an ARINC 653 partitioned operating environment, attempt to minimize the jitter so that partitions start at nearly the same time within the major time frame as possible for each repetition of the major time frame, so that their period of execution is nearly constant. That is, their period of execution is equal to the major time frame duration, or nearly so. The deviation from this constant period could be as large as the sum of the jitter for all prior partition switches during any particular major time frame.

The problem with the standard approach is that time-partitioned operating systems generally do not permit the use of asynchronous tasks such as interrupts. This is because interruption of a partition could interfere with its allocation of time on the CPU or affect its performance in other ways (such as reducing cache hit rates). However, interrupts are the most commonly understood and utilized mechanisms in computer systems for dealing with events that occur asynchronously (such as the arrival of an I/O signal to the computing hardware). Prohibition of interrupt mechanisms for handling I/O forces use of the lower-performance "polling" mechanism, whereby a partition only acts on an I/O event when it is scheduled, which could result in latency of an entire major time frame or more. FIG. 3 illustrates this delay in responding to an input signal because the system cannot handle the I/O until the associated partition (Partition 1 in this example) is scheduled. In essence, the standard approach suffers high latency in I/O response as a consequence of requiring a certain kind of determinism (very small variability in the period of execution for partitions).

SUMMARY OF THE INVENTION

The present invention provides a method for scheduling and controlling asynchronous tasks to provide deterministic behavior in time-partitioned operating systems running a plurality of synchronous and asynchronous tasks. In one embodiment, the method includes establishing a credit-based time accounting system that includes accounting for time consumed by asynchronous tasks, and dynamically decreasing the time allocated to asynchronous tasks so that the occurrence or non-occurrence of asynchronous tasks does not interference with any other tasks (including synchronous tasks or other asynchronous tasks).

In one embodiment, the method includes the general steps of: (a) assigning to each synchronous task a portion of a major time frame to use the computer resource; (b) assigning to each asynchronous task a portion of the major time frame to use the computer resource, (c) dynamically reducing the portion of the major time frame assigned to each asynchronous task in real time as a function of (e.g. proportionate to) time remaining in the major time frame; and (d) enforcing use of the computer resource according to the assigned portions of the major time frame. The present invention may be used to schedule and control use of essentially any shared computer resources. The present invention may be used to control use of a single resource or a combination of resources. For example, the present invention may be configured to allocate time on one or more CPUs (or processor cores), or it may additionally or alternatively used to allocate time using memory and other forms of storage, input and output devices, latency of communication and bandwidth of communication.

The portion of a major time frame not assigned to synchronous tasks may be referred to as "reserved time." In one embodiment, the present invention allows asynchronous tasks with sufficient allocated time remaining to run during reserved time. In some applications, there may be a difference between the total reserved time in a major time frame and the total amount of time allocated to asynchronous tasks during a major time frame. This difference may be referred to as "extra time." In one embodiment, extra time can be consumed without affecting the amount of time available to asynchronous tasks. Once all extra time has been consumed, further depletion of reserved time will affect the amount of time available to asynchronous tasks.

In one embodiment, the method includes implementation of a watchdog timer that is set to expire when there is no longer sufficient reserved time in the major time frame to guarantee all allocated asynchronous tasks can run. In one embodiment, this watchdog timer is referred to as an "End Approaching" watchdog timer ("EAWT"), and it is set to expire when there is no longer sufficient time for all remaining asynchronous tasks to occur. For example, in one embodiment, each asynchronous task may have a minimum amount of time required to initiate handling of the asynchronous task, which may be referred to as the worst-case minimum invocation ("WCMI") for that task. In this embodiment, the expiration time of the EAWT may be determined by subtracting the WCMI for all asynchronous tasks from the duration of the major time frame. If desired, the expiration of the EAWT may be adjusted over the major time frame to account for the occurrence of asynchronous tasks. For example, when an asynchronous task occurs prior to the expiration of the EAWT, the expiration of the EAWT can be recomputed without accounting for the WCMI for that task.

In one embodiment, the time available for each asynchronous task is reduced as a function of the passage of time within a major time frame while maintaining any constraint imposed by the amount of reserved time remaining in the major frame. For example, the time available for each asynchronous task may be reduced in proportion to the amount of time elapsed in a major time frame. The time available for an asynchronous task may also be reduced as a function of the time used by that task. For example, the time allocated to an asynchronous task may be reduced one-for-one by the amount of time consumed by an asynchronous task. In this example the DTR of each asynchronous task must be less than the reserved time remaining in the major frame. The time available for an asynchronous task may also be sustained during the execution of other tasks. For example, the time allocated to an asynchronous task may only be reduced during its own execution or during the execution of reserved time. In this example the sum total of DTR for all asynchronous tasks must be less than the remaining reserved time in the major frame.

In one embodiment, the method may include implementation of a watchdog timer for each asynchronous task that is set to expire when the dynamic time remaining for the task is expended or the WCMI for that task has elapsed. This timer may be referred to as an "Out of Time" watchdog timer ("OOTWT"), and it may be used to return control from an asynchronous task when the time allocated for that task has expired. In one embodiment, the OOTWT for a task is set just before the asynchronous task is invoked.

In one embodiment, asynchronous tasks are triggered by interrupts, and the interrupts are enabled or disabled by masking or unmasking the event. For example, when there is sufficient time for an asynchronous task to occur, the interrupt is unmasked, and when there is no longer sufficient time for an asynchronous task to occur, the interrupt is masked until the next major time frame. As another example, an interrupt can be masked when an asynchronous task is not permitted to interrupt a current task.

In one embodiment, an asynchronous task is permitted to interrupt synchronous tasks as long as there is sufficient time available for that asynchronous task. In this embodiment, the asynchronous tasks take priority over synchronous tasks. Given that asynchronous tasks can interrupt synchronous tasks, this embodiment may permit the system to more quickly address asynchronous tasks, which can in some application be more time critical that synchronous tasks.

In one embodiment, asynchronous tasks are not permitted to interrupt synchronous tasks. Instead, in this embodiment, time may be reserved in each major time frame for asynchronous tasks. The major time frame may include statically scheduled synchronous tasks, and the time available for asynchronous tasks may be distributed between each statically scheduled synchronous task.

In one embodiment, each asynchronous task is associated with one or more synchronous tasks and each asynchronous task is permitted to run during a time portion assigned to the associated synchronous task.

In one embodiment, an asynchronous task is given a priority and permitted to interrupt a lower priority asynchronous task as long as there is sufficient time available for that asynchronous task. In this embodiment, high priority asynchronous tasks are allowed to impact lower priority asynchronous tasks.

In one embodiment, the time available to an asynchronous task is decremented only when: (i) that asynchronous task has run or (ii) reserved time is consumed and all of the extra time has been exhausted. In one embodiment, the time available to an asynchronous task is decremented on a "one-for-one" basis when that event runs, and the time available to an asynchronous task is decremented as a function of its remaining allotment of time when reserved time is consumed and the extra time is exhausted. In one embodiment, the extra time is equivalent to the total amount of reserved time in a major time frame minus the total amount of time allocated to asynchronous tasks.

In one embodiment, the times available to the various asynchronous tasks are considered for adjustment each time a task is activated or deactivated. In one embodiment, the times available to the various asynchronous tasks are adjusted upon task activation only if that activation occurs while the system was in a reserved time period consuming reserved time. This allows the system to account for the reserved time consumed. In one embodiment, the time available to an asynchronous task is reduced when that asynchronous task is deactivated.

In another aspect, the present invention provides a system capable of implementing the methods described above. In one embodiment, the system generally includes a computing environment having a processor (e.g. a microprocessor) or any other integrated circuit capable of being programmed to carry out the methods of the present invention, such as a field-programmable gate-array ("FPGA") or an application specific integrated circuit ("ASIC"), a timer (e.g. a hardware timer), a memory management unit, an interrupt mechanism capable of selectively masking interrupts, configuration/allocation information (which may be stored in the memory management unit) and a boot mechanism (e.g. a boot loader stored in boot ROM). In operation, the boot mechanism may load the hypervisor, operating system ("OS") and/or other runtime environment for implementing the present invention. The OS may then read the configuration/allocation information from a pre-defined storage location, such as Flash memory mapped to its address space. In one embodiment, the configuration/allocation information defines the major time frame, the location of application executable images, the mapping of applications to partitions, the schedule of partitions (i.e., synchronous tasks) within the major time frame, the list of interrupt signals and associated interrupt handlers (i.e., asynchronous tasks), and so forth. The OS may validate the allocation information to ensure it is consistent and feasible. The OS may implement the schedule of partitions by setting a hardware timer to expire each time a different partition should be started and configuring the timer interrupt signal to invoke an OS partition timer handler. It may also start timers for each asynchronous task to track their time remaining. The OS can either use a separate timer for each task, or use a single timer to recognize each timing event across any of the tasks. The OS then starts the major time frame by starting the timer and then invoking the first partition. In one embodiment, the timers and interrupt signals are protected and cannot be altered by normal applications but only by the OS through hardware-enforced protection mechanisms.

The present invention provides systems and methods that are capable of implementing asynchronous tasks in a deterministic manner, thereby allowing the use of asynchronous tasks in a time-partitioned operating environment. The present invention may allow asynchronous tasks to be handled as they occur or at different times in the major time. Accordingly, embodiments of the present invention may provide improved handling of asynchronous tasks when compared with conventional systems and methods that use polling methods to initiate asynchronous tasks. In use, the present invention allows each task to use its allocated time (though the allocation for asynchronous tasks is dynamically reduced) while ensuring that the occurrence or non-occurrence of one task does not impact the ability of another task to occur. Although described primarily in the context of processor time, the present invention may be used to schedule and control use of other resources, such as memory or other storage, access to input and output devices, latency of communication and bandwidth of communication.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 1 is an illustration of the time allocation of three partitions in a major time frame in accordance with the prior art.

FIG. 2 is an illustration showing partition scheduling jitter.

FIG. 3 is an illustration demonstrating operation of a prior art system incorporating input/output handing using a polling method.

FIG. 4 is an illustration representing the "leaky water cooler" analogy.

FIG. 5 is an illustration showing time allocation in accordance with an embodiment of the present invention.

FIG. 6 is an illustration showing variations in time allocation during operation in accordance with an embodiment of the present invention.

FIG. 7 is an illustration showing the components of an asynchronous task.

FIG. 8 is a table showing time allocation and the dynamic reduction of time for asynchronous tasks.

FIG. 9 is an illustration similar to FIG. 3 showing the timing of asynchronous task handling in accordance with an embodiment of the present invention.

FIG. 10 is an illustration of showing time allocation during operation in accordance with an alternative embodiment.

FIG. 11 is an illustration of showing the timing of tasks in accordance with an alternative embodiment.

FIG. 12 is an illustration similar to FIG. 5 showing time allocation in accordance with an embodiment of the present invention using an alternative decrement function.

FIG. 13 is an illustration similar to FIG. 6 showing time allocation in accordance with an embodiment of the present invention using an alternative decrement function.

FIG. 14 is an illustration similar to FIG. 10 showing time allocation during operation in accordance with an alternative embodiment using an alternative decrement function.

FIG. 15 is an illustration similar to FIG. 14 showing time allocation during operation in accordance with an alternative embodiment using an alternative decrement function.

DESCRIPTION OF THE CURRENT EMBODIMENT

I. Overview.

The present invention provides systems and methods for scheduling and controlling asynchronous tasks to provide deterministic behavior in time-partitioned operating systems running a plurality of synchronous and asynchronous tasks. With the present invention, determinism can be maintained even with asynchronous tasks, such as interrupts. In one embodiment, the systems and methods, first, implement a credit-based time accounting system that includes accounting for time in asynchronous tasks each major time frame. Second, the time allocated to asynchronous tasks is dynamically decreased over the duration of the major time frame, so that the presence or absence of one task does not interfere with another task. The present invention may implement any of a variety of alternative methods for scheduling asynchronous methods. These various methods may be selected based on the desired priority/hierarchy between synchronous and asynchronous tasks. In one embodiment, asynchronous tasks may be run only during "reserved" portions of time between statically-scheduled synchronous tasks. In an alternative embodiment, scheduling is essentially open and an asynchronous task may be run at any time during the major time frame (provided that is has sufficient allocated time remaining to run). In another alternative embodiment, each asynchronous task is associated with at least one synchronous task and is permitted to run only during a period of time allocated to the group of associated tasks. In yet another alternative embodiment, different asynchronous tasks may follow different scheduling approaches. For example, in one implementation, a high priority asynchronous task may be permitted to interrupt a synchronous task, while lower priority asynchronous tasks may not be permitted to interrupt, but rather be allowed to run only in reserved portions of time.

The present invention may be implemented in essentially any computing system and may run directly on the host hardware or may be run on an underlying operating system or other host software/firmware. In various alternative embodiments, the present invention may be implemented as (a) a hypervisor, (b) an integral part of an operating system or (c) as software separate from any underlying hypervisor or operating system. For example, the present invention may be implemented in the form of a hypervisor that runs directly on the hardware and provides an interface to the operating system for hardware and software components. As another example, it may be implemented as a hypervisor that runs on an underlying operating system and provides an interface for a guest operating system. As a further example, the present invention may be incorporated directly into an operating system so that its functionality is integral to the operating system. In this alternative, the operating system may be a host operating system or it may be a guest operating system.

II. Dynamic Time Allocation.

As noted above, the present invention uses dynamic time allocation for asynchronous tasks. Dynamic time allocation generally involves decreasing the time allocated to an asynchronous task over a major time frame. This concept may be generally illustrated by reference to the "leaky water cooler" analogy represented in FIG. 4. In this analogy, CPU execution time available to an asynchronous task is represented by the water in the cooler. At the start of each major time frame, the water is refilled to the maximum. The water then slowly leaks out via the leaky valve on the left, so that there is no water left by the end of the major time frame. Whenever the asynchronous task runs, then additional water is released through the valve on the right, equivalent to the amount of CPU execution time used by the task. The task can only run as long as there is sufficient water in the tank. During the execution of an asynchronous task, the leak may be temporarily plugged to prevent additional leakage beyond that required for correct operation.

As can be seen, this embodiment follows a "use it or lose it" approach. While the occurrence of an asynchronous task early in the major time frame does not prevent another task from also occurring, if the allocated time for an asynchronous task was not decreased during the major time frame, then one asynchronous task could still occur late in the major time frame thereby preventing the occurrence of another asynchronous task, resulting in interference between the tasks. In essence, this solution of dynamically decreasing the allocated time maintains determinism: (a) all tasks receive their allocation of resources during every major time frame regardless of the presence or absence of unrelated tasks, (b) the sequence of execution of synchronous tasks remains constant, and (c) the major time frame duration remains constant. However, under this approach, the period of execution time between successive invocations of a synchronous task is allowed to vary more so than in the standard approach. Nevertheless, this period of execution time is still deterministically bounded.

This analogy provides a reasonably accurate representation of how dynamic time allocation for an asynchronous task is determined. The present invention may, however, include additional scheduling and control features that operate in concert with dynamic time allocation to provide deterministic outcomes. For example, the present invention may also have the ability to stop running an asynchronous task when its dynamic time allocation has expired. As another example, the present invention may also be configured to prevent any individual asynchronous task from running if it occurs so late in the major time frame that its occurrence could impact the ability of another task from running. These and other additional scheduling and control features are described in more detail below.

III. "Reserved" Scheduling.

As noted above, the present invention may implement any of a variety of alternative scheduling algorithms. In one embodiment, time is reserved in each major time frame for asynchronous tasks (e.g., interrupt handling) and the remaining time is distributed in-between statically scheduled synchronous tasks (e.g., ARINC 653 partitions). For example, a portion of reserved time may be scheduled between each synchronous task. Asynchronous events (such as interrupts) that would invoke an asynchronous task (such as interrupt handlers) are disabled by masking the event during the time in the schedule reserved for a synchronous task, and then enabled by unmasking the event during the time available for asynchronous tasks-provided those tasks have sufficient remaining time in their dynamic allocation.

FIG. 5 illustrates this allocation. The time available for asynchronous tasks labeled "Interrupt 1" and "Interrupt 2" starts each major time frame at the maximum allocated for that task and then decreases over the major time frame until it reaches zero at the end, at which point it is replenished. Statically scheduled synchronous tasks are shown as "Partition 1", "Partition 2", and "Partition 3". These tasks are run on the processor at a predetermined time within the major time frame. The "Reserved" time windows are then available for an asynchronous task, but only if an event occurs that causes the asynchronous task to be invoked and the task has sufficient time remaining in its dynamically allocated budget. In this embodiment, the Dynamic Time Remaining ("DTR") for an asynchronous task is a function of (e.g. proportional to) the time left until the end of the major time frame, is always less than the reserved time left until the end of the major time frame, and furthermore, the DTR is not affected by the presence, absence, or ordering of other tasks. FIG. 12 illustrates this allocation using one decrement function, where DTR is held constant during the execution of a task and updated using a linear function of the reserved time remaining in the major time frame with a slope recomputed after each execution of an asynchronous task. FIG. 15 illustrates a similar decrement function, which differs in that the DTR for each asynchronous task is decremented only when: (i) that asynchronous task has run or (ii) reserved time is consumed (i.e. reserved time passes while no asynchronous task is running) and all of the extra time has been exhausted. In this example, the DTR for an asynchronous task is decremented on a one-for-one basis when that task runs and is decremented using a linear function of the reserved time remaining in the major time frame with a slope recomputed after each execution of an asynchronous task.

The dynamically decreasing time allocated to an asynchronous task is decreased further by any time the task actually uses, as illustrated in FIG. 6. The time allocated to asynchronous tasks is labeled as "Int 1 Avail" and "Int 2 Avail", decreasing to zero over the major time frame. However, each time an asynchronous task is invoked and uses part of its time budget (labeled as "Int 1 Used" and "Int 2 Used"), then that time is subtracted from its budget. During the execution of an asynchronous task, the time budgets of the remaining asynchronous tasks may be frozen to avoid charging double charges. Or equivalently time budgets may continue to be decreased and after the completion of an asynchronous task, the time subtracted from its budget can be credited to the remaining asynchronous tasks, proportional to their initial allotment. FIG. 13 illustrates this allocation using one decrement function, where DTR is held constant during the execution of a task and updated using a linear function of the reserved time remaining in the major time frame with a slope recomputed after each execution of an asynchronous task.

A system to implement this method may use protected hardware timers and interrupt signals. For example, in one embodiment, the OS is booted on the processing hardware first. The timers and interrupt response mechanisms cannot be altered by normal applications but only by the OS through hardware-enforced protection mechanisms. The OS reads the configured allocation information from a pre-defined storage location, such as Flash memory mapped to its address space. This allocation information defines the major time frame, the location of application executable images, the mapping of applications to partitions, the schedule of partitions (i.e., synchronous tasks) within the major time frame, the list of interrupt signals and associated interrupt handlers (i.e., asynchronous tasks), and so forth. The OS validates the allocation information to ensure it is consistent and feasible. The OS implements the schedule of partitions by setting a hardware timer to expire each time a different partition should be started and configuring the timer interrupt signal to invoke an OS partition timer handler. It also starts timers for each asynchronous task to track their time remaining. It also may configure interrupt response mechanisms, performing activities such as masking or unmasking interrupt signals, installing interrupt handlers, or configuring an interrupt vector jump table. It then starts the major time frame by starting the timer and then invoking the first partition.

During the major time frame, if an asynchronous event (e.g., an I/O interrupt signal) is received and it is enabled (unmasked), then the associated asynchronous task (e.g., an I/O interrupt handler) is invoked. The asynchronous task is a software task, or thread of execution, which runs on the computer processor. The system runs the task via the following steps. First, the underlying hardware invokes the operating system ("OS"). Second, the OS identifies the asynchronous task (e.g., an I/O interrupt handler) associated with the causing event (e.g., an I/O interrupt signal). It starts an appropriate "Out of Time" watchdog timer ("OOTWT"), which will expire when the DTR for the identified asynchronous task is less than the Worst Case Minimum Invocation ("WCMI"). Generally speaking, the Worst Case Minimum Invocation refers to an amount of time associated with minimal invocation of a task. For example, referring to FIG. 7, the WCMI for a task may be equivalent to the time required for the hardware to invoke the OS, the OS to set the OOTWT and for the OS to invoke the handler for the task (e.g. an I/O handler in the context of an asynchronous I/O event). In some applications, the WCMI may also include the time required for the OS to carry out responsibilities after the task has been stopped. For example, and again with reference to FIG. 7, in addition to the time associated with the hardware invoking the OS, the OS setting the OOTWT and the OS invoking the handler for the task, the WCMI may also include the time required for the OS to manage the time and to schedule the next task. (This implicitly will also cause the OOTWT to expire before the DTR reaches zero, since WCMI is always greater than zero.) Third, the OS invokes the associated asynchronous task. Fourth, the asynchronous task performs its work on the processor, including managing the event that caused its occurrence. Fifth, when the asynchronous task finishes its work, it returns control to the OS. Sixth, the OS accounts for the time spent by the asynchronous task, including all overhead time, subtracting it from the Dynamic Time Remaining ("DTR") for that handler. The DTR is computed as a function of (e.g. proportional to) the time left to reach the end of the major time frame, while maintaining any constraint imposed on the DTRs by the amount of reserved time remaining in the major frame. If the DTR is less than or equal to the Worst Case Minimum Invocation ("WCMI"), then the interrupt is masked for the rest of the major time frame. Seventh, the OS schedules the next task. FIG. 7 illustrates these steps.

In one embodiment, the DTR is computed as a fraction of the maximum time allocated at the start of the major time frame, as a function of (e.g. proportional to) the time remaining in the major time frame. As illustrated in FIG. 5, the DTR for an interrupt handler starts out each major time frame at the maximum and then decreases to zero before the end of the last reserved execution window in the major time frame. Each time the asynchronous task is invoked, the time to execute the task (including any overhead) is subtracted from the DTR and then the DTR is recomputed as a function of (e.g. proportional to) the reserved time remaining until the end of the major time frame.

To illustrate the benefit of dynamically decreasing allocation of time, consider a system designed to accommodate up to two asynchronous tasks. If the time budget for these tasks is not dynamically decreased, then in the worst case, both tasks could save up their time, waiting to be invoked until nearly the end of the last reserved execution window in the major time frame. Then both the events that cause invocation of the asynchronous tasks could occur simultaneously and just prior to end of the allowable scheduling window. Both tasks would have time remaining in their allocated time budget, but only one would have time to run and the second would be prevented from running due to the presence of the first. Thus, the tasks could interfere with each other's resource allocation. Now consider the same system, but with dynamically decreasing allocation of the time budget. In this case, the tasks cannot "save up" their time because the system dynamically decreases it. The decreasing function is selected and the initial budget time constant for each task is set so that it can only run for at most ½ of the reserved time remaining before the end of the major time frame, always leaving room for the other task (whether it actually is present or not). Similarly, the system could accommodate N tasks by setting the initial budgets and dynamically decreasing the allocated time so that each task could only run at most 1/N of the reserved time remaining until the end of the major time frame.

If the OOTWT expires, then the OOTWT handler is invoked. The OOTWT handler will first suspend the associated asynchronous task, if it is running. Second, it will mask the event (e.g., an I/O interrupt signal event) associated with the asynchronous task for the rest of the current major time frame. When the next major time frame begins, the event will be unmasked and its Dynamic Time Remaining is replenished to the maximum. If the asynchronous task was previously suspended because it ran out of time, it will continue execution at the same point in the software where it was suspended. Continuation could be accomplished in several ways. For example, unfinished tasks from the prior major time frame could be scheduled immediately in the new major time frame, or the unfinished tasks could be scheduled in the first available reserved time (time when statically scheduled synchronous task are not scheduled), or the unfinished tasks could be scheduled again only when a new associated I/O signal occurred.

All asynchronous events are enabled by unmasking the event signals at the first allowable asynchronous task scheduling time within the major time frame, an "End Approaching" watchdog timer ("EAWT") is set, which will expire when the end of the last reserved minor time frame is approaching. When invoked, this timer will disable all asynchronous events by masking the signals, because there is no longer enough time to guarantee all allocated asynchronous tasks can run. This prevents one handler from interfering with another when there is not sufficient time for all of them. The precise expiration time for the EAWT is computed far enough prior to the end of the last reserved minor time frame so that each allocated interrupt handler could still achieve its WCMI, even if all were simultaneously signaled. The figures do not show EAWT in order to avoid confusion with other functionality. In one embodiment, the expiration time of the EAWT may be determined by subtracting the WCMI for all asynchronous tasks from the duration of the major time frame. In an alternative embodiment, the EAWT may be adjusted over the major time from to account for the occurrence of asynchronous tasks. More specifically, the expiration of the EAWT may be recomputed each time that an asynchronous is run. For example, when an asynchronous task occurs prior to the expiration of the EAWT, the expiration of the EAWT can be recomputed without accounting for the WCMI for that task.

In one possible implementation, an example configuration might be as follows:
  Asynchronous Task 1 labeled "Int1" is allocated 10 ms per major time frame
  Asynchronous Task 2 labeled "Int2" is allocated 6 ms per major time frame
  Asynchronous Task 3 labeled "Int3" is allocated 9 ms per major time frame
  Synchronous tasks 1, 2, and 3 (labeled "P1", "P2", "P3") are each allocated 10 ms, separated by 10 ms, per major time frame
  The major time frame is set at 60 ms
  Reserved time is 30 ms (i.e. length of major time frame–time allocated to synchronous tasks: 60 ms–30 ms=30 ms)
  Extra time is 5 ms (i.e. reserved time–time allocated to asynchronous tasks: 30 ms–25 ms=5 ms)

In this example, FIG. 8 shows how the DTR for each asynchronous task might be computed using two alternative functions. Notice that each task begins the major time frame with its maximum allocated time. As the major time frame proceeds, the time available to the handler decreases. It decreases further when the handler is invoked. With the first function, the DTR for each asynchronous task is decremented only when: (i) that asynchronous task has run or (ii) reserved time is consumed (i.e. reserved time passes while no asynchronous task is running) and all of the extra time has been exhausted (See also FIG. 15). With this function, the DTR for an asynchronous task is decremented on a "one-for-one" basis when that event runs, and the DTR for an asynchronous task is decremented as a function of its remaining allotment of time when reserved time is consumed and the extra time is exhausted. The alternate function differs from the first function in that it uses a constantly decreasing linear function, which does not suspend the budget decrease operation during the execution of an asynchronous task and decrements the DTR for a task regardless of the amount of extra time remaining.

With this scheduling algorithm, asynchronous tasks may be masked during the execution of the statically scheduled synchronous tasks and then unmasked, if they have DTR available, in the time between the windows of execution for the synchronous tasks (labeled as "Reserved" in FIG. 5). In this case, the time to respond to I/O signals, i.e., the latency, is significantly improved over the standard approach. FIG. 9 illustrates the improved I/O response time, showing an event labeled "I/O signal" arriving during the execution window of a synchronous task labeled "Partition 1", with the asynchronous task labeled "interrupt" invoked immediately after the synchronous task finishes. Similarly, in one possible implementation, during the execution of the handler for a particular asynchronous task, all other asynchronous events are masked so that they cannot interrupt the currently executing task.

IV. Open Scheduling.

In the "reserved" scheduling approach discussed above, asynchronous tasks are masked during synchronous tasks and are run only in reserved portions of time between synchronous tasks. In an alternative embodiment, the system may permit asynchronous tasks to run at any time during the entire major time frame. In one embodiment of this "open" scheduling approach, an asynchronous task is permitted to interrupt operation of a synchronous task and the interrupted synchronous task may be completed after the asynchronous task is complete. An example of this is shown in FIG. 14, which illustrates time allocation in an implementation with two synchronous tasks (Partition 1 and Partition 2) and two asynchronous tasks (Interrupt 1 and Interrupt 2) that may run during reserved time in a major time frame. As can be seen, the system allows Interrupt 1 to run when it occurs even though Partition 1 was already running. This causes the system to temporarily stop operation of Partition 1 while Interrupt 1 is running as represented by the cross-hatched region in Partition 1. When Interrupt 1 has completed, Partition 1 resumes and its end time is extended by the amount of time used by Interrupt 1. In this example, extension of the end time of Partition 1 causes Partition 1 to extend into time that was originally assigned to Partition 2. To account for this, the system delays Partition 2 (as represented by the cross-hatched region in Partition 2). Although the occurrence of Interrupt 1 causes Partition 2 to start later in time than originally scheduled, the system shifts both the start and end times of Partition 2 so that Partition 2 still runs for the originally allocated amount of time.

In this embodiment, the OS may run an asynchronous task generally in accordance with the steps discussed above, except as described here. In this embodiment, asynchronous tasks remain unmasked during operation of synchronous tasks. When an interrupt occurs, the underlying hardware invokes the Operating System (OS). In this alternative embodiment, the OS preempts any task that is currently running on the computer processor, saving its state so that it can be invoked at a later time to continue from where it left off when preempted. After control has been returned from the asynchronous task to the OS and the OS has accounted for time spent by the asynchronous task, the OS schedules the next task, which might be the task that it originally preempted, or could be a different task if no task was preempted.

In implementations of this "open" scheduling approach, asynchronous tasks are enabled during the entire major time frame, provided they have sufficient DTR. FIG. 10 illustrates this implementation, where the synchronous task labeled "Partition 1" is interrupted by an asynchronous task labeled "Int 1", and then continues after the asynchronous task has finished. Partition 1 still receives its allocated processor time, but no longer continuously. FIG. 14 illustrates this implementation using a decrement function where DTR is held constant during the execution of a task and updated using a linear function of the reserved time remaining in the major time frame with a dynamic slope dictated by the same.

In this case, the asynchronous tasks (such as an interrupt handler) should not disturb the interrupted synchronous task (such as an ARINC 653 partition) nor interfere with its resources. That is, the interrupted task must still receive its full allocation of time and none of its memory or system state may be modified, including the contents of all cache memory it is using, Translation Look-Aside Buffer (TLB) entries, branch prediction buffers, and so forth. This can be accomplished in a number of ways including, but not limited to, methods such as (a) turning off cache access (though this results in a large decrease in performance), or (b) restoring the cache contents after the asynchronous task is done, or (c) preventing the asynchronous task from using cache memory, or (d) by using software-based partitioning of the cache to ensure the asynchronous task uses different cache memory locations than the interrupted partition, or (e) by using hardware-based partitioning of the cache to ensure use of differing memory locations.

In an alternative "open" scheduling approach, interrupts and partitions have no priority. In this case, no task ranks higher than another task by any prioritization scheme. This is intentional, so that each task receives its allocated time for each major time frame regardless of the presence or absence of unrelated tasks. That is, a first task (either synchronous or asynchronous) will receive its allocated time regardless of whether a second task is never invoked or whether it is invoked as often as possible. Furthermore, once a task is invoked, it runs until it is finished or its allocated time is used up and it cannot be interrupted for any other reason or any other task. The system is thus deterministic in allocation of time, even if the specific order of execution within a major time frame is not the same each time. In one implementation of this embodiment, the OS may be configured to run the synchronous tasks in a particular order and for a specified period of time, subject to the occurrence of intervening asynchronous tasks. When an asynchronous task with sufficient DTR is triggered, it will be run before subsequent synchronous tasks. This allows asynchronous tasks to shift the starting time for subsequent tasks, including subsequent synchronous tasks. For example, when it is time to initiate a task, the OS may function differently depending on whether or not an asynchronous task has been triggered. If an asynchronous task has been triggered, the OS will run the asynchronous task until it is complete or has consumed its allocation of time. If an asynchronous task has not been triggered, the OS will initiate the next synchronous task, which will be permitted it to run until its time has expired.

In another alternative "open" scheduling approach, interrupts and partitions are assigned a priority and higher priority tasks can interrupt lower priority tasks. The system is still deterministic in allocation of time, but the latency of low priority tasks can be impacted by frequently occurring high priority tasks.

In an open scheduling approach, the system may need to be designed so that statically scheduled synchronous tasks can tolerate a larger jitter. Partitioned software applications can tolerate jitter when their required behavior does not depend on a precisely constant period of execution. Even in traditional partitioned operating environments like ARINC 653, jitter is not zero, and thus all partitioned applications must tolerate jitter to some degree. In the case of this implementation, the jitter is not only due to variability in OS overhead when switching synchronous tasks (partitions) are running on the processor, but is also due to the variation in whether asynchronous tasks occur or not. This results in a higher overall variability of starting time within the major time frame for partitions, and thus a higher variability in the period of execution. The minimum time between executions would be one major time frame less the sum of all asynchronous task budgets and the maximum would be bounded, based on the allocation of asynchronous tasks, and always less than two major time frames. FIG. 11 illustrates this concept. Three synchronous tasks are labeled "Partition 1", "Partition 2", and "Partition 3". Two asynchronous tasks are labeled "Interrupt 1" and "Interrupt 2". In the first major time frame, the synchronous tasks are run at their scheduled time and then the asynchronous tasks are invoked (presumably because their corresponding events occurred at that moment), with Interrupt 2 occurring twice. Then in the second major time frame, Interrupt 1 and Interrupt 2 occur at the start of the major time frame, slightly delaying Partition 1. Interrupt 2 occurs again, slightly delaying Partition 2. In each major time frame, all tasks receive their allocated time. All synchronous tasks occur in a deterministic sequential order. This increase in jitter for synchronous tasks (while retaining deterministic allocation and ordering) also applies for implementations that allow asynchronous tasks to interrupt synchronous tasks.

V. "Associated" Scheduling.

As noted above, the present invention may implement an "associated" scheduling approach. With this scheduling algorithm, asynchronous tasks are associated with synchronous tasks in a group, and the system allocates time to them as a group. In one embodiment of an "associated" scheduling approach, asynchronous tasks, such as interrupt threads, are associated with a statically scheduled synchronous task, such as an ARINC 653 partition. The system statically allocates time to a partition, dividing the time budget between the synchronous task and the sum total of its associated asynchronous tasks (such as interrupt threads). Processing time is allocated at the start of each major time frame. The statically scheduled partitions are allocated a static amount of time and scheduled for a deterministic ordering within the major time frame. The asynchronous tasks are allocated a dynamic amount of time, which starts at the maximum allocation and then decreases as the major time frame proceeds, reaching zero time available before the end of the last reserved window in the major time frame. With this approach, asynchronous tasks are permitted to run within reserved portions of time between the statically scheduled synchronous tasks. As such, this implementation may be seen as implementing a "reserved associated" scheduling approach.

In another implementation of "associated scheduling," asynchronous tasks, such as interrupt threads, are associated with a statically scheduled synchronous task, such as an ARINC 653 partition. The synchronous task and all associated asynchronous tasks are allocated an amount of processor time in total, which they can divide as needed. Processing time is allocated at the start of each major time frame. The synchronous task and associated asynchronous tasks are allocated a dynamic amount of time, which starts at the maximum allocation and then decreases as the major time frame proceeds, reaching zero time available before the end of the last reserved window in the major time frame. In this embodiment, asynchronous tasks are unmasked and permitted to run during the entire time allocated to the group of synchronous and asynchronous tasks, provided that they have sufficient DTR remaining. As a result, with this approach, asynchronous tasks may interrupt an associated synchronous task. Accordingly, this implementation may be referred to as an "open associated" scheduling approach.

In another implementation, asynchronous tasks are associated with synchronous tasks and are only enabled during the scheduled time for the synchronous task. Thus, the asynchronous task can only interrupt the synchronous task to which it is associated.

VI. Exemplary Implementation.

The present invention may be implemented in a wide variety of computing environments. In one embodiment, the system generally includes a computing environment having a processor (e.g. a microprocessor) or any other integrated circuit capable of being programmed to carry out the methods of the present invention, such as a field-programmable gate-array ("FPGA") or an application specific integrated circuit ("ASIC"), a timer (e.g. a hardware timer), a memory management unit, an interrupt mechanism capable of selectively masking interrupts, configuration/allocation information (which may be stored in the memory management unit) and a boot mechanism (e.g. a boot loader stored in boot ROM). In this embodiment, the boot mechanism loads the OS configured to implement the present invention. As noted above, the present invention may be implemented in a hypervisor, OS or other runtime environment. In this embodiment, the present invention is integrated into the OS as reflected in remainder of the description. It should, however, be noted that in alternative embodiments some or all of the functions of present invention may be carried out by a hypervisor or other runtime environment.

In one embodiment, the system includes one or more sets of configuration/allocation information that dictates the allocation of resources. The configuration/allocation information may be stored in an XML format compatible with the ARINC 653 standard. This information may be stored in a configuration record that is read and validated by the OS at boot time. If more than one partition schedule is provided, the events that trigger a change to a new schedule are also defined in the configuration record, for example, a list of the partitions that have permission to request a mode change that will switch to a different partition schedule.

The configuration/allocation information can be recorded in a variety of ways. The format of the allocation information could indicate the absolute or relative amount of the resource that should be reserved for each application or for each task associated with an application or associated to some attribute. The allocation could be done for a set of applications or tasks, for example, a set that contains explicitly identified members or a set where members all share some attribute or set of attributes, where an attribute could be some characteristic or lack of a characteristic or a specific combination of attributes. The allocation information could be stored explicitly in a configuration record that is accessed in some way by the partitioned operating system to dictate the allocation of resources. The allocation information could also be implicit within the software of the partitioned operating system itself. The allocation information could be static so that it doesn't change once the system is started or it could be changed occasionally based on certain events or modes of operation recognized by the partitioned operating system.

This embodiment implements a partition timer using a hardware timer and implements an associated partition switch handler in the OS that is invoked whenever the partition timer expires. The hardware timer cannot be modified directly by any partition, but only by the OS itself. When the partition switch handler is invoked, it performs several actions. (a) It stops access to a resource for the partition that just ended. (b) It provides access to a resource for the partition that is scheduled to run next according to the currently configured allocation schedule. (c) It resets the hardware timer to expire after the configured duration of the next partition window.

This embodiment implements an OOTWT using a hardware timer for each asynchronous task that has DTR allocated to it and implements an associated OOTWT handler. The hardware timer cannot be modified by any partition, but only by the OS itself. The OOTWT timer is configured and started at the start of each major time frame. When the OOTWT expires and the handler is invoked, it performs several actions: (a) it stops access to a resource for the associated asynchronous task and (b) it prevents invocation of the asynchronous task by masking the associated interrupt signal.

This embodiment implements an EAWT using a hardware timer and implements an associated EAWT handler. The hardware timer cannot be modified directly by any partition, but only by the OS itself. The EAWT timer is configured and started at the start of each major time frame. When the EAWT expires and the handler is invoked, it performs several actions: (a) it stops access to a resource for all asynchronous tasks and (b) it prevents invocation of all asynchronous tasks by masking the associated interrupt signals.

If there are not a sufficient number of hardware timers to implement all the timer functions, a single hardware timer can be used that is set to expire at the earliest expiration time across all timer functions. Whenever a timer handler is invoked because of a timer expiration, then the new expiration time is again set according to the shortest expiration time remaining.

This embodiment uses a distinct interrupt signal to invoke each asynchronous task, so that each asynchronous task can be individually masked in hardware.

This embodiment implements asynchronous task handlers with bounded worst-case execution times.

This embodiment decreases time budgets as a linear function of the reserved time remaining until the end of the major frame, suspending this operation during the execution of a task and re-computing the slope of the function after the execution of the asynchronous task.

In order to meet jitter requirements, this embodiment masks asynchronous tasks during execution of the statically scheduled synchronous tasks and then unmasks the asynchronous tasks, if they have DTR available, in the time between the windows of execution for the synchronous tasks as shown in FIG. 13.

This embodiment implements selection of alternative embodiments through changes to the system configuration.

The present invention may be implemented using a wide variety of methods that are capable of adjusting the times available for different asynchronous tasks as appropriate. For example, the system may adjust times available on a continuous basis, on a periodic basis and/or based on the occurrence of specific events. In one embodiment, adjustments to the times available for each of the asynchronous tasks are computed using a general event-based algorithm. In this particular embodiment, the system runs the algorithms that may adjust the time available to each of the asynchronous tasks whenever a task is activated or deactivated. The following pseudo code implements the primary functionality of one embodiment of this approach:

```
Global constants:
    used time = sum of asynchronous task budgets
    total reserved time = sum of reserved minor frame
Global variables:
    extra time
    act time
    deact time
    reserved time counter
Every asynchronous task has:
    budget
    slope
    max budget
Wait until:
    Start of the major frame
    1.  reserved time counter := total reserved time
    2.  extra time := total reserved time − used time
    3.  deact time := now
    4.  For each asynchronous task:
        a.  counter := max budget
        b.  slope := (counter / reserved time counter)
Task activation
    1.  If we were in a reserved window:
        a.  time spent := (now − deact time)
        b.  reserved time counter := reserved time counter − time spent
        c.  if (time spent > extra time)
                i.  time spent := time spent − extra time
                ii. extra time := 0
        d.  else
                iii. time spent := 0
                iv. extra time := extra time − time spent
        e.  For each asynchronous task
                a.  counter := counter − time spent * slope
        f.  act time := now
Task deactivation
    1.  If deactivated task is an asynchronous task: that ran
        a.  time spent := (now − act time)
        b.  counter := counter − time spent.
    2.  For each asynchronous task:
        a.  slope := (counter / reserved time counter)
    3.  deact time := now
```

In this embodiment, a number of global constants are established. These include: (i) "total reserved time," which is the total amount of time in a major time frame that is not assigned to synchronous tasks and (ii) "used time," which is the total amount of time allocated to the various asynchronous tasks.

In this embodiment, a number of global variables are established. These include: (i) "extra time," which is the difference between the total amount of reserved time minus the total amount of time allocated to the various asynchronous tasks; (ii) "act time," which is the time at which a task is activated; (iii) "deact time," which is the time at which a task is deactivated and (iv) "reserved time counter," which is a dynamic variable that contains the remaining amount of time in a major time frame that is not assigned to synchronous tasks.

In this embodiment, each asynchronous task also includes its own set of variables. These asynchronous task specific variables include: (i) "budget," which is a dynamic variable that represents the remaining time available for that asynchronous task during the current major time frame, (ii) "slope," which represents the budget decrement rate for the asynchronous task, which is set and updated so that the sum of all budgets is never greater than the reserved time remaining and the budget of each asynchronous task reaches zero at the end of the last reserved window in the major frame, and (iii) "max budget," which represents the original allocation of time to that asynchronous task at the start of the major time frame.

When a major time frame begins, the counter variables for each asynchronous task are reset to their original values; the "reserved time counter" variable is reset to its original value; the "slope" variable for each asynchronous task is computed; the "extra time" variable is reset to its original value, and the "deact time" variable is set to the current time.

The system then waits for a task to be activated or deactivated before changing the counter variables. In this case, the system is waiting for either a synchronous or asynchronous task to activate or deactivate. Upon task activation, the system determines whether the task was activated while the system was using reserved time. If so, the system takes action to account for the consumed reserved time, if necessary. First, the system determines the time spent since the last deactivation by subtracting the "deact time" variable from the current time. The result is stored in the "time spent" variable. This time is the subtracted from the "reserved time counter" variable. Next, the system determines whether there is enough extra time to cover the time spent. If all of the extra time is exhausted or the time spent exceeds extra time (e.g. time spent>extra time), the system apportions the time spent across the asynchronous tasks. Any remaining extra time is first subtracted from the time spent and then the counters for each asynchronous task are reduced as a function of the remaining time spent. The process of accounting for unused and no longer available reserved time across the asynchronous task is equivalent to the "leaking" stage described in the analogy presented above.

When a task is deactivated, the system carries out several steps. First, it determines if the deactivated task was an asynchronous task. If so, the system charges the time consumed by the deactivated task against that tasks allocation of time on a one-for-one basis. To do this, the system subtracts the current time from the "act time" variable to determine the time spent by that task. The time spent is then subtracted from the "counter" variable for that task. In this embodiment, the entire amount of time spent by the deactivated task is charged against the asynchronous task that just deactivated so there is no need to deduct (or "leak") time from the time available to the other asynchronous tasks. The system then recalculates the slope or "leak rate" for each of the asynchronous tasks to compensate for the updated budget ratios. In this embodiment, the "slope" variable for each task is made equal to the "counter" variable divided by the "reserved time counter" variable. As a result, the time is allocated against each asynchronous task is in proportion to how much of the remaining reserved time is allocated to that task, the sum of all budgets will never be greater than the reserved time remaining, and the budget of each asynchronous task will reach zero at the end of the last reserved window in the major frame. Alternative algorithms for computing slope and thereby apportioning lost reserved time against the various asynchronous tasks may be employed in alternative embodiments. Finally, the "deact time" variable is set to the current time so that it can be used to compute the time spent when the next task is activated.

In operation, the system may continually run the algorithms associated with task deactivation ("Task Deactivation" subroutine) and task activation ("Task Activation" subroutine) until the major time expires and a new major time frame is started. At start of a new major time frame, the system may return control to the "Start of the major frame" subroutine, where the variables are reset in preparation of the new major time frame.

FIG. 15 is a representation showing time allocation during operation of this algorithm and associated pseudo code. In this implementation, the system has two synchronous tasks (Partition 1 and Partition 2) and two asynchronous tasks (Interrupt 1 and Interrupt 2) that may run during reserved time in a major time frame. "Int 1 Avail" and "Int 2 Avail" are dynamic variables that represents the time available to Interrupt 1 and Interrupt 2, respectively, over the major time frame. In this example, the portion of the major time frame reserved for asynchronous tasks is greater than the amount of time allocated to all asynchronous tasks. As a result, the major time frame has some extra time. The "Extra Time" plot of FIG. 15 shows the amount of extra time remaining over the major time frame. As can be seen, the times available to asynchronous tasks (e.g. "Int 1 Avail" plot and "Int 2 Avail" plot) are not reduced when reserved time is consumed (i.e. reserved time passes while no asynchronous task is running) until all of the extra time has been exhausted (See "Expires" in FIG. 15). Until the extra time has been exhausted, the time available to an asynchronous task is only reduced when that asynchronous task runs.

The algorithm and associated pseudo code discussed above are merely exemplary. The present invention may be implemented using a variety of alternative algorithms. As noted above, the algorithms and pseudo code discussed above implement the primary functionality of the system. This includes the setting and controlling of time available to asynchronous tasks. It does not include the ancillary functionality that may vary with different scheduling approaches. Although not specifically discussed, the algorithm and pseudo code presented above may be readily adapted to work in "Reserved Scheduling," "Open Scheduling," and "Associated Scheduling" approaches (discussed above). These different scheduling approaches may be implemented by adding code to control when tasks are masked and unmasked as described elsewhere in this disclosure. The algorithm and code may also be adapted to implement the "End Approaching" watchdog timer and all other functionality discussed herein.

VII. Types of Partitioned Resources.

Although described primarily in the context of scheduling and controlling the use of CPU or processor time, the methods described here can be used to partition use of essentially any resource shared between tasks to allow deterministic yet asynchronous use of that shared resource. The method applies to essentially all resources including, but are not limited to, processing elements (such as a CPU or a processor core), memory and other storage, access to input and output devices, latency of communication, bandwidth of communication, and so forth.

For example, FIG. 6 illustrates the shared resource of CPU time, which this method manages by dynamically decreasing availability. The shared resource managed by this method could instead be number of bytes available to send or receive on an I/O channel within the current major time frame, or the number of OS file descriptors that can be used, or any other resources that are shared by two or more partitioned applications.

The method can also manage combinations of shared resources, such as time on the CPU and also number of bytes that can be transmitted on an I/O channel, implementing a dynamically decreasing cap on availability with a different constant of proportional decrease for each. The management of each resource within a set of managed resources could be enforced on each resource independently or else the management could be done so that some desired relationship between resources is enforced, such as (but not limited to) decreasing I/O bandwidth availability at twice the dynamic rate as memory semaphore availability is decreased.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of apportioning access to a computer resource for a plurality of computer applications, the method comprising the steps of:
    establishing a recurring major time frame for the computer resource, the major time frame representing a fixed-length period of clock time;
    providing each synchronous task with a scheduled and reserved portion of the major time frame periodic time budget to use the computer resource;
    assigning to each asynchronous task a reserved time budget representing an unscheduled amount of the major time frame periodic time budget, the reserved time budget for each asynchronous task being less than the total amount of time in the major time frame periodic time budget not scheduled to synchronous tasks; and
    enforcing the assigned task time budget for each of the plurality of tasks to thereby operate the computer resource entirely in real time over sequential recurring major time frames wherein the reserved time budget for each asynchronous tasks is decreased proportionate to the time remaining in the major time frame and, for at least a portion of the major time frame, at a rate more rapid than clock-time progresses.

2. The method of claim 1 wherein the system apportions overhead time associated with each task into that task's time budget.

3. The method of claim 2 where at least one of the asynchronous tasks is an interrupt handler assigned according to the occurrence of the interrupt.

4. A time-partitioned computer system for assigning processor time consumed by operating system services provided on behalf of a plurality of applications running in a real-time environment, the system executing the method of claim 3.

5. The method of claim 2 further comprising the step of releasing the computing resource when one of the plurality of tasks terminates.

6. The method of claim 1 wherein the sum total of the time budget of all tasks enabled during a major time frame is no more than the major time frame duration.

7. The method of claim 6 wherein the enforcing step comprises denying creation of a task when insufficient time for the task remains in the schedule and the termination of a task if it is already running when its allocated time runs out.

8. The method of claim 7 wherein a watchdog timer implements the detection of insufficient time remaining.

9. The method of claim 7 wherein the asynchronous tasks are interrupt handlers and the system denies creation of them by masking the associated interrupt.

10. The method of claim 7 wherein asynchronous tasks that are terminated because their allocated time ran out are then continued in the subsequent major time frame.

11. The method of claim 10 wherein an asynchronous task is continued by scheduling it to run immediately when the next major time frame begins.

12. The method of claim 10 wherein an asynchronous task is continued in the next major time frame by scheduling it to run in the first available window of time not reserved by a synchronous task.

13. The method of claim 10 wherein an asynchronous task is continued in the next major time frame only when and if its corresponding event occurs in the next major frame.

14. The method of claim 7 wherein insufficient time for creation is defined as the moment when there is less time until the end of the major time frame than it would take in the worst case for the task to be created and an associated watchdog timer to be initiated for it.

15. The method of claim 7 wherein the system denies creation of any asynchronous task at the moment when there is less time until the end of the major time frame than it would take in the worst case for all asynchronous tasks to be created and an associated watchdog timer to be initiated for each.

16. The method of claim 7 wherein asynchronous tasks are isolated from one another by denying creation for any of them after the moment in time after there is insufficient time for all asynchronous tasks to be started and terminated before the end of the major time frame.

17. The method of claim 15 wherein a watchdog timer implements the detection of insufficient time.

18. The method of claim 1 wherein the system allows commencement of asynchronous tasks at any time.

19. The method of claim 18 wherein if a synchronous tasks was running at the time an asynchronous task is commenced, then the synchronous task is paused until the asynchronous task finishes, after which the synchronous task is continued.

20. The method of claim 18 wherein commencement of asynchronous tasks is allowed only while an associated synchronous task is running.

21. The method of claim 1 wherein the system denies creation of asynchronous tasks while other tasks are currently running.

22. The method of claim 20 wherein the system denies commencement of asynchronous tasks if they would not finish in the worst case before the scheduled start time of a synchronous task.

23. The method of claim 20 wherein asynchronous tasks are allowed to commence even if they would not finish in the worst case before the scheduled start time of a synchronous task, provided the delayed synchronous task would still finish before the end of the major time frame.

24. The method of claim 20 wherein the system denies commencement of asynchronous tasks only if the currently running task is a synchronous task.

25. The method of claim 20 wherein the system denies commencement of asynchronous tasks only if the currently running task is an asynchronous task.

26. The method of claim 1 where the computer processor consists of multiple processing units.

27. The method of claim 25 wherein the multiple processing units are separately scheduled cores within a CPU.

28. The method of claim 25 wherein the system schedules a plurality of tasks on a plurality of processing units.

29. The method of claim 1 wherein asynchronous tasks are allowed to interrupt synchronous tasks, provided the asynchronous task does not interfere with the resources allocated for the synchronous task.

30. The method of claim 29 wherein asynchronous tasks that interrupt synchronous tasks are prevented from interference with resources allocated to the synchronous task by preventing the asynchronous task from modifying the memory of the synchronous task, including cache memory.

31. The method of claim 29 wherein asynchronous tasks that interrupt synchronous tasks are prevented from interference with resources allocated to the synchronous task by restoring the cache memory resource for the synchronous task to its state at the moment of interruption.

32. The method of claim 18 wherein commencement of higher priority tasks is allowed while a lower priority task is running.

33. The method of claim 1 wherein the system allows scheduling of higher priority tasks while lower priority tasks are currently running.

* * * * *